United States Patent
Kim

(10) Patent No.: US 7,462,416 B2
(45) Date of Patent: Dec. 9, 2008

(54) SECONDARY BATTERY

(75) Inventor: Jun Ho Kim, Asan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 579 days.

(21) Appl. No.: 11/139,050

(22) Filed: May 27, 2005

(65) Prior Publication Data

US 2005/0266302 A1 Dec. 1, 2005

(30) Foreign Application Priority Data

May 31, 2004 (KR) .................. 10-2004-0039164

(51) Int. Cl.
- H01M 10/50 (2006.01)
- H01M 6/36 (2006.01)
- H02B 1/04 (2006.01)
- H05K 5/00 (2006.01)
- H05K 7/00 (2006.01)
- H02J 7/00 (2006.01)
- H02J 7/16 (2006.01)
- H01C 7/13 (2006.01)

(52) U.S. Cl. .................. 429/62; 429/112; 361/634; 361/679; 320/107; 320/150; 338/22 R

(58) Field of Classification Search .................. 429/59, 429/62, 174; 338/232, 22 R, 221, 234; 320/107, 320/150; 525/88–132, 208; 361/634, 813; 29/623.1–623.5

See application file for complete search history.

(56) References Cited

U.S. PATENT DOCUMENTS

| | | | | |
|---|---|---|---|---|
| 5,990,779 A | * | 11/1999 | Katsuki et al. | ............... 338/232 |
| 6,924,625 B2 | * | 8/2005 | Teraoka et al. | ............... 320/150 |
| 2002/0060898 A1 | * | 5/2002 | Nagai et al. | ................. 361/634 |

FOREIGN PATENT DOCUMENTS

EP  0 773 595 A1  5/1997

\* cited by examiner

*Primary Examiner*—Alexa D. Neckel
*Assistant Examiner*—Claire L Rademaker
(74) *Attorney, Agent, or Firm*—Christie, Parker & Hale, LLP

(57) ABSTRACT

A secondary battery having an improved electrical connection structure of a secondary protective device by positioning a thermo-breaker in a protective device groove, in order to improve the stability of the secondary battery while minimizing the occupation of the inner space of the can. The secondary battery includes an electrode assembly having positive and negative electrode tabs. A can contains the electrode assembly therein. A cap assembly has an insulated electrode terminal and a cap plate for sealing the top opening of the can. A protective device groove is formed on the bottom surface of the cap plate. A thermo-breaker is seated in the protective device groove while being connected between the first electrode tab and the electrode terminal. When the temperature inside the battery reaches a predetermined value, the bimetal loses contact and the electrical current inside the battery is interrupted, avoiding overcharge/over-discharge or explosion of the battery.

18 Claims, 7 Drawing Sheets

SECONDARY BATTERY

CROSS REFERENCE TO RELATED APPLICATIONS

This application claims priority to and the benefit of Korean Patent Application No. 2004-0039164 filed on May 31, 2004 in the Korean Intellectual Property Office, the entire content of which is incorporated herein by reference.

BACKGROUND OF THE INVENTION

1. Field of the Invention

The present invention relates to a secondary battery, and, more particularly, to a secondary battery having an improved electrical connection structure of a secondary protective device which improves the stability of the secondary battery and reduces the inner space of the can.

2. Description of the Related Art

As portable wireless appliances including video cameras, mobile telephones, and portable computers generally become lighter while incorporating more functions, secondary batteries have been researched intensively for use as the driving power for the appliances. For example, secondary batteries include nickel cadmium batteries, nickel hydrogen batteries, nickel zinc batteries, and lithium secondary batteries. Lithium secondary batteries are widely used in the cutting-edge electronic appliance field because they are rechargeable. They can be made in a compact size with a large capacity. They have a high operation voltage. They also have a high energy density per unit weight.

In secondary batteries, an electrode assembly, which includes positive and negative electrode plates and a separator, is contained in a metallic can. An electrolyte is then injected into the can, which is sealed to form a bare cell. The bare cell generally has an electrode terminal positioned on the top thereof while being insulated from the can. The electrode terminal acts as one electrode of the battery and the battery can itself acts as the other electrode thereof.

After the bare cell is sealed, a safety apparatus including a secondary protective device, such as a positive temperature coefficient (PTC) thermistor, and a protective circuit module (PCM) is connected to the top of the bare cell and is encased in a battery pack or molded with a resin to form a secondary battery. The safety apparatus is connected to positive and negative electrodes and interrupts electrical currents when the temperature or voltage of the battery rises abruptly due to overcharge or over-discharge, in order to avoid dangers such as the fracture of the battery.

FIG. 1 is a partial sectional view showing a bare cell of a conventional secondary battery according to the prior art. The bare cell 10 of the secondary battery includes a can 20, an electrode assembly 22, and a cap assembly 30. The bare cell 10 may also include a secondary protective device 40 on the top thereof, depending on the construction of the secondary battery.

The can 20 is a metallic container having a hexahedron shape but with its top open. The can may be fabricated by deep drawing. The can 20 may be made of aluminum or an aluminum alloy, which is light metal of good conductivity and excellent corrosion resistance. The can 20 contains the electrode assembly 22, which includes a positive electrode 23, a separator 24, and a negative electrode 25, and an electrolyte. After the electrode assembly 22 is inserted into the can 20 through its top opening, the top opening is sealed by the cap assembly 30.

The cap assembly 30 is provided with a planar plate-type cap plate 31 having the size and shape corresponding to those of the top opening of the can 20.

The electrode assembly 22 is formed by winding positive and negative electrodes 23, 25 with a separator 24 interposed between them. The positive electrode 23 is electrically connected to the cap plate 31 via a positive electrode tab 26 and the negative electrode 25 to a negative terminal 32 of the cap plate 31 via a negative electrode tab 27. The can 20 is electrically insulated from the negative terminal 32 and acts as a positive terminal. After the cap assembly 30 is welded to the top of the can 20, an electrolyte is injected through an electrolyte injection hole 36 of the cap plate 31. The electrolyte injection hole 36 is sealed by a cap 37 made by press-fitting a ball.

The cap plate 31 may be made of the same material as that of the can 20, i.e., aluminum or an aluminum alloy, for improved welding to the can 20. The cap plate 31 has a terminal through-hole formed in the center thereof, through which the negative terminal 32 can pass. A tube-shaped gasket 33 is positioned on the exterior of the negative terminal 32 which extends through the center of the cap plate 31 for electrical insulation between the negative terminal 32 and the cap plate 31. An insulation plate 34 is positioned beneath the cap plate 31 near the terminal through-hole of the cap plate 31. A terminal plate 35 is positioned beneath the insulation plate 34.

The secondary protective device 40 is seated on the top surface of the cap plate 31 and is connected between the negative terminal 32 and a PCM (not shown in the drawing). A PTC thermistor or a thermal fuse may be used as the secondary protective device 40.

However, conventional secondary batteries configured as above have a problem in that the secondary protective device, which must detect the temperature change inside the can and interrupt electrical currents if necessary, is positioned on the exterior of the can and has a deteriorated temperature sensitivity.

Accordingly, there is a need for a secondary battery having an improved electrical connection in order to improve the stability of the secondary battery while minimizing the reduction in the inner space of the can.

SUMMARY OF THE INVENTION

In accordance with the present invention, a secondary is provided wherein a thermo-breaker for breaking an electrical current path through the battery is placed in a protective device groove formed on the bottom of a cap plate inside the battery can.

In an exemplary embodiment, a secondary battery includes an electrode assembly having first and second electrode tabs; a can for containing the electrode assembly therein; a cap assembly having an insulated electrode terminal and a cap plate for sealing the top opening of the can; a protective device groove formed on the bottom surface of the cap plate; and a thermo-breaker seated in the protective device groove while being connected between the first electrode tab and the electrode terminal.

The thermo-breaker may include a bimetal having an end connected to the first electrode tab; a terminal lead wire having an end connected to the electrode terminal and the other end in contact with the bimetal; and a case having a closed space into which the bimetal may be inserted from a first lateral surface and the terminal lead wire may be inserted from a second lateral surface thereof.

The bimetal may be formed by vertically laminating metal having a larger expansion coefficient and made of any one chosen from an alloy of copper and zinc, an alloy of nickel and manganese or iron, an alloy of nickel, chromium, and iron, and an alloy of nickel, manganese, and copper and another metal having a smaller expansion coefficient and made of an alloy of nickel and iron. The bimetal preferably has a thickness of 0.1-1.0 mm.

The thermo-breaker may have an elastic body positioned between the bimetal and the terminal lead wire. The elastic body may be a plate spring or a coil spring.

The case may include a case body which is of a box-type with an open top and which has a bimetal hole and a terminal lead wire hole formed on the bottom of a first and second lateral surface thereof, respectively, so that the bimetal and the terminal lead wire penetrate the first and second lateral surface, respectively, to be fixed, and a cover for sealing the top of the case body.

The case body may have a first through-hole formed below a position in which the terminal lead wire is seated and the terminal lead wire may be exposed to the bottom of the case body while sealing the first through-hole.

The case body may have a second through-hole formed below a position in which the bimetal is seated and the bimetal may be exposed to the bottom of the case body while sealing the second through-hole.

The case body may have a first through-hole formed below a position in which the terminal lead wire is seated and a second through-hole formed below a position in which the bimetal is seated, the terminal lead wire may be exposed to the bottom of the case body while sealing the first through-hole, and the bimetal may be exposed to the bottom of the case body while sealing the second through-hole.

The case may be made of any material chosen from polypropylene (PP), polyimide (PI), polyphenylene sulfide (PPS) or nylon 66.

The thermo-breaker may have a conductive plate positioned beneath the bimetal. The conductive plate may be made of any one chosen from copper, nickel, aluminum, and silver.

The thermo-breaker may have a thin plate-type ceramic PTC thermistor positioned beneath or on top of the bimetal. The ceramic PTC thermistor may be made of barium titanate-based material.

BRIEF DESCRIPTION OF THE DRAWINGS

FIG. 5b is a bottom view of the thermo-breaker shown in FIG. 5a.

DETAILED DESCRIPTION

Figure 1:
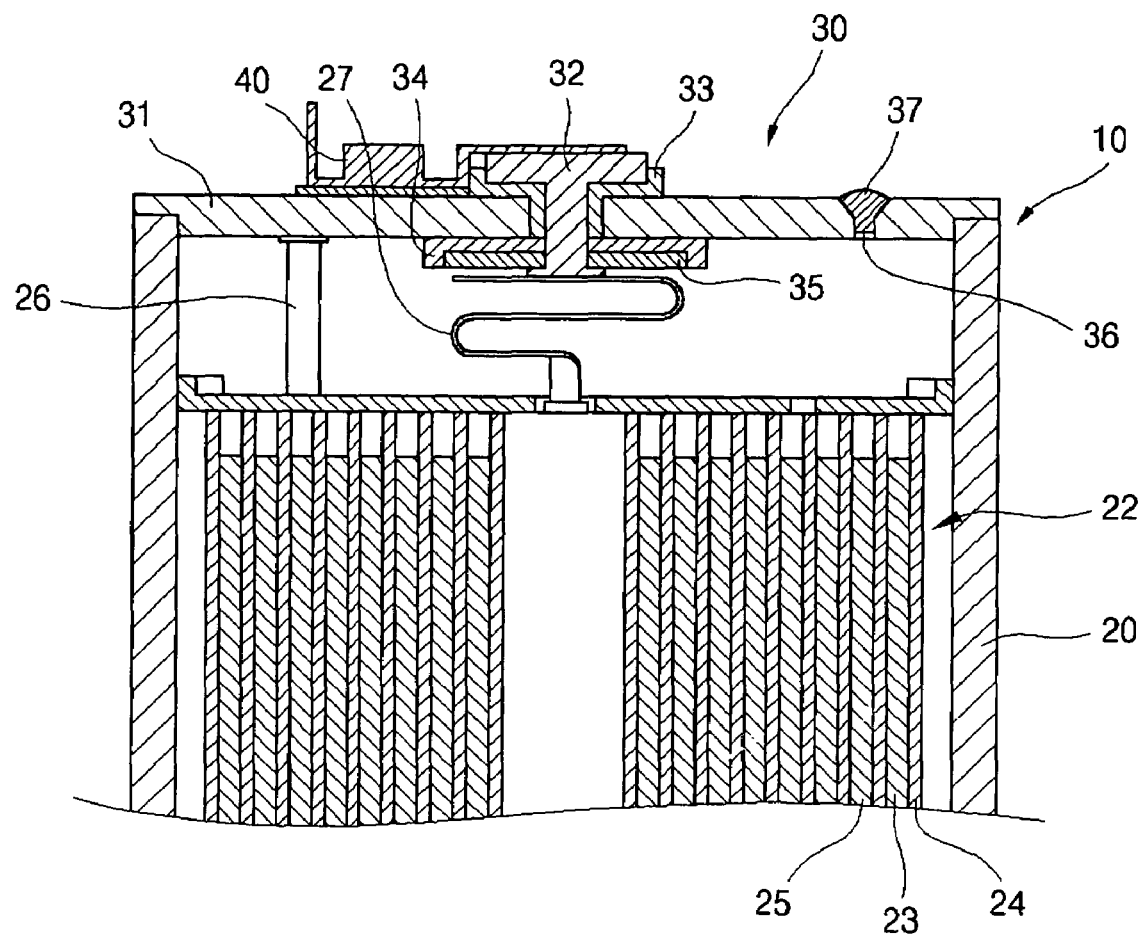
FIG. 1 is a partial sectional view showing a cap assembly of a conventional secondary battery.
Figure 2:
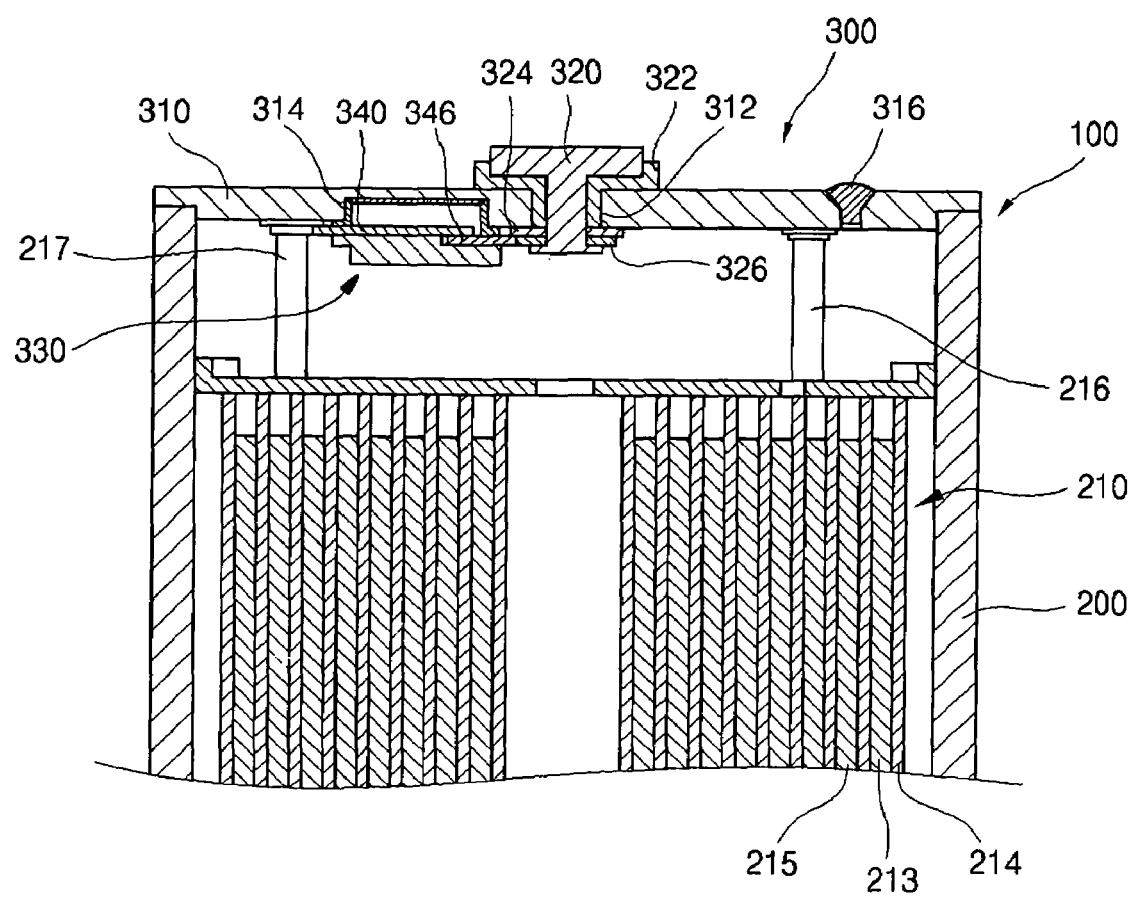
FIG. 2 is a partial sectional view showing a cap assembly including a thermo-breaker according to an embodiment of the present invention.

Referring to FIG. 2, a bare cell 100 of a secondary cell according to an embodiment of the present invention includes a can 200, an electrode assembly 210 contained in the can 200, a cap assembly 300 for sealing the top opening of the can 200, and a secondary protective device 330.

The can 200 may be made of metallic material with a hexahedron shape. The can 200 itself may act as a terminal. The top of the can 200 is open and forms a top opening, through which the electrode assembly 210 may be inserted to be contained in the can 200.

The electrode assembly 210 includes first and second electrode plates 215, 213 and a separator 214. After the first and second electrode plates 215, 213 are laminated with the separator 214 interposed between them, they may be rolled into a jelly-roll configuration. A first electrode tab 217 is welded to the first electrode plate 215, and an end of the first electrode tab protrudes toward the top of the electrode assembly 210. A second electrode tab 216 is welded to the second electrode plate 213, and an end of the second electrode tab also protrudes toward the top of the electrode assembly 210. Although the first electrode plate and tab 215, 217 are generally configured as the negative electrode plate and tab and the second electrode plate and tab 213, 216 as the positive electrode plate and tab, the configuration may be switched depending on the type of secondary battery.

The cap assembly 300 includes a cap plate 310, an electrode terminal 320, and a secondary protective device 330.

The cap plate 310 is a metallic plate having a size and shape corresponding to the top opening of the can 200. The cap plate 310 has a terminal through-hole 312 formed on a side thereof with a predetermined size. The cap plate 310 has a protective device groove 314 formed on the bottom surface thereof, into which the secondary protective device 330 is inserted and fixed. The electrode terminal 320 is inserted into the terminal through-hole 312. The cap plate 310 has an electrolyte injection hole 316 formed on the other side thereof, through which an electrolyte is injected. The second electrode tab 216 of the electrode assembly 210 is welded to the other side of bottom surface of the cap plate 310.

The electrode terminal 320 is inserted into the terminal through-hole 312 with a tube-shaped gasket 322 interposed between the electrode terminal 320 and the cap plate 310 for insulation. A terminal plate 326 is positioned beneath the cap plate 310 and is electrically connected to the bottom surface of the electrode terminal 320. An insulation plate 324 is provided to electrically insulate the terminal plate 326 and the electrode terminal 320 from the cap plate 310. The insulation plate 324 may be made of an insulation tape, such as a PP tape. Although the electrode terminal 320 generally acts as a negative terminal, it may also act as a positive terminal to be connected to the second electrode tab 216, depending on the position.

Figure 3:
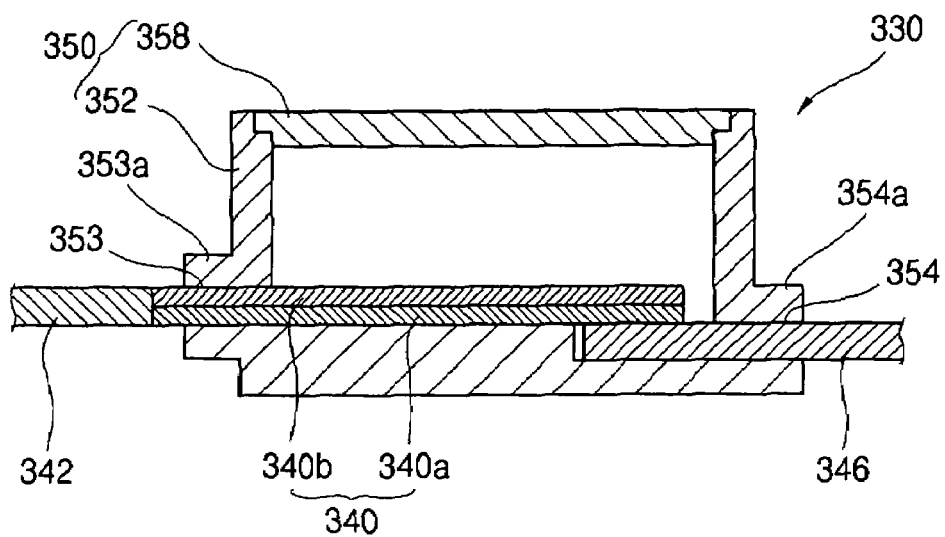
FIG. 3 is a sectional view of the thermo-breaker shown in FIG. 2.
Figure 4:
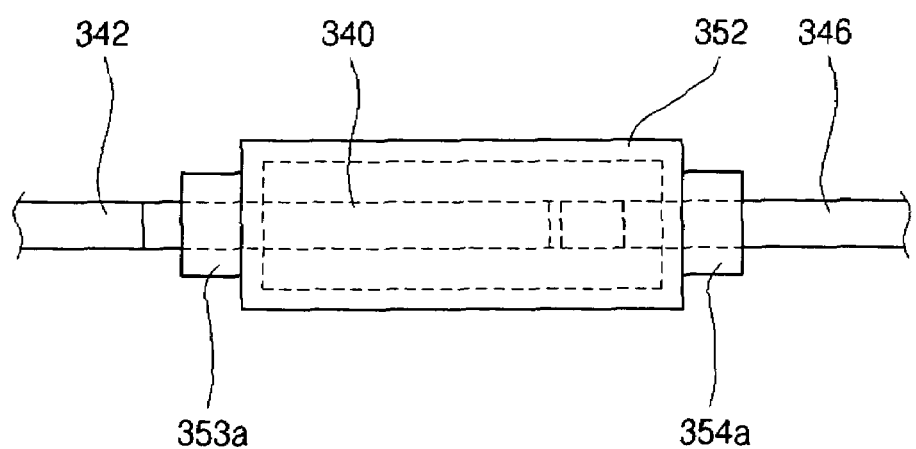
FIG. 4 is a bottom view of the thermo-breaker shown in FIG. 3.

Referring to FIGS. 3 and 4, the secondary protective device 330 is made of a thermo-breaker including a bimetal 340 and a case 350 for containing the bimetal 340 therein and is inserted and fixed into the protective device groove 314 (FIG. 2) formed on the bottom surface of the cap plate. As the second protective device 330 is positioned in the protective device groove 314, the height of the cap assembly is minimized while avoiding excessive occupation of the inner space of the can.

The bimetal 340 is made by bonding two kinds of metal foil having different expansion coefficients (the degree of expansion of metal according to temperature) and deforms toward the metal having the smaller expansion coefficient as temperature changes. In one exemplary embodiment, metal 340*b* having a smaller expansion coefficient is positioned on top of metal 340*a* having a larger expansion coefficient. Consequently, the bimetal is positioned in the horizontal direction in lower temperature and deforms upward, i.e., toward the metal 340*b* having smaller expansion coefficient, as temperature rises. The bimetal 340 may be made of various metal foils bound together. The metal 340*a* having the larger expansion coefficient may be made of an alloy of copper and zinc, an alloy of nickel, manganese, and iron, an alloy of nickel, chromium, and iron, or an alloy of nickel, manganese, and copper. The metal 340*b* having the smaller expansion coefficient may be made of an alloy of nickel and iron. For good response in lower temperature, the bimetal in one exemplary embodiment is made from an alloy of nickel, manganese, and iron and an alloy of nickel and iron, which are bound together.

The bimetal 340 is made of thin metal foils and preferably has a thickness of 0.1-1.0 mm. If the bimetal 340 is too thin, it is difficult to position the bimetal 340 horizontally and the contact with lead wires 342, 346 may become unstable. If the bimetal 340 is too thick, it may become insensitive to temperature and fail to function properly.

An end of the bimetal 340 is connected to the terminal plate 326 (FIG. 2) and the electrode terminal 320 (FIG. 2) via a terminal lead wire 346 and the other end thereof to the first electrode tab 217 (FIG. 2) via a tab lead wire 342. The terminal lead wire 346 may be integrated with the terminal plate 326. The bimetal 340 may be configured in such a manner that it also plays the role of the tab lead wire 342 and may be directly connected to the first electrode tab 217.

The case 350 includes a case body 352 and a cover 358. The case body 352 is of a box-type with an open top and has a bimetal hole 353 and a terminal lead wire hole 354 formed on the bottom of both lateral surfaces through which the bimetal 340 and the terminal lead wire 346, respectively, extend to be fixed. The bimetal hole 353 and the terminal lead wire hole 354 have reinforced portions 353*a*, 354*a*, respectively, extending a predetermined length from the exterior of the case 350 in order to retain the bimetal 340 and the terminal lead wire 346 and to prevent them from moving up and down. The case body 352 may have a step or groove formed on the inner bottom thereof so that the bimetal 340 and the terminal lead wire 346 may be seated in predetermined positions.

The bimetal 340 and the terminal lead wire 346 may be fixed to the bimetal hole 353 and the terminal lead wire hole 354, respectively, of the case body 352 with an adhesive. Specifically, the gap between the bimetal 340 and the bimetal hole 353 and the gap between the terminal lead wire 346 and the terminal lead wire hole 354 are sealed by an adhesive to prevent electrolyte from flowing into the case. Alternatively, the bimetal 340 and the terminal lead wire 346 may be molded together when molding the case body 352. The bimetal 340 and the terminal lead wire 346 make physical contact with each other and, if electrolyte flows into the case 330, the electrolyte may contact the bimetal 340 or the terminal lead wire 346 and make the contact between them unstable.

The cover 358 is coupled to the top of the case body 352 and seals the interior of the case 350.

The case 350 is positioned inside the can 200 (FIG. 2) and makes contact with the electrolyte. The case 350 may be made of a resin having resistance to the electrolyte, for example, PP, PI, PPS or nylon 66.

Figure 5A:
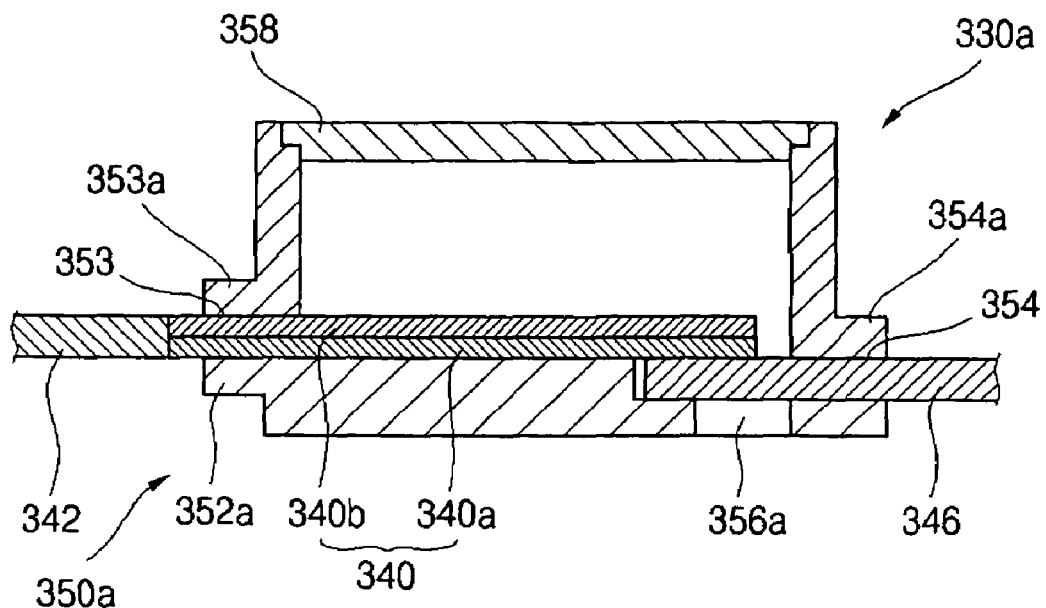
FIG. 5a is a sectional view of a thermo-breaker according to another embodiment of the present invention.
Figure 5B:
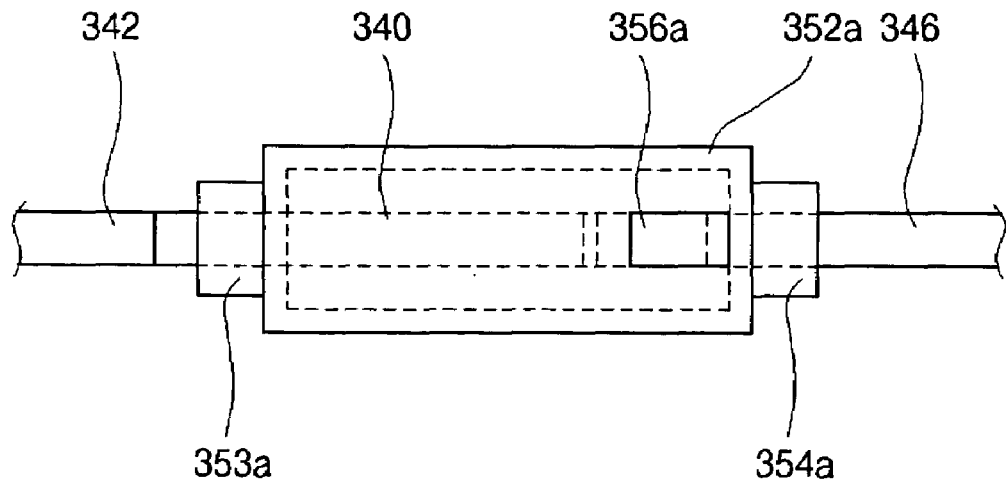

Referring to FIGS. 5*a* and 5*b* showing another embodiment of the present invention, a case 350*a* constituting a thermo-breaker 330*a* includes a case body 352*a* and a cover 358. Repeated description of the components identical to those of the above-mentioned embodiment will be omitted, but the differences will now be described.

The case body 352*a* has a through-hole 356*a* formed at a location corresponding to a part on which a terminal lead wire 346 is seated. The terminal lead wire 346 is attached to the top of the first through-hole 356*a* with an adhesive to seal the first through-hole 356*a*. The terminal lead wire 346 is exposed to the bottom of the case body 352*a*, specifically to the interior of the can 200, via the through-hole 356*a*.

Accordingly, the terminal lead wire 346 quickly transmits the temperature change inside the can 200. As a result, the bimetal 340 which is in contact with the terminal lead wire 346 can quickly sense the temperature change in the can 200.

Figure 6A:
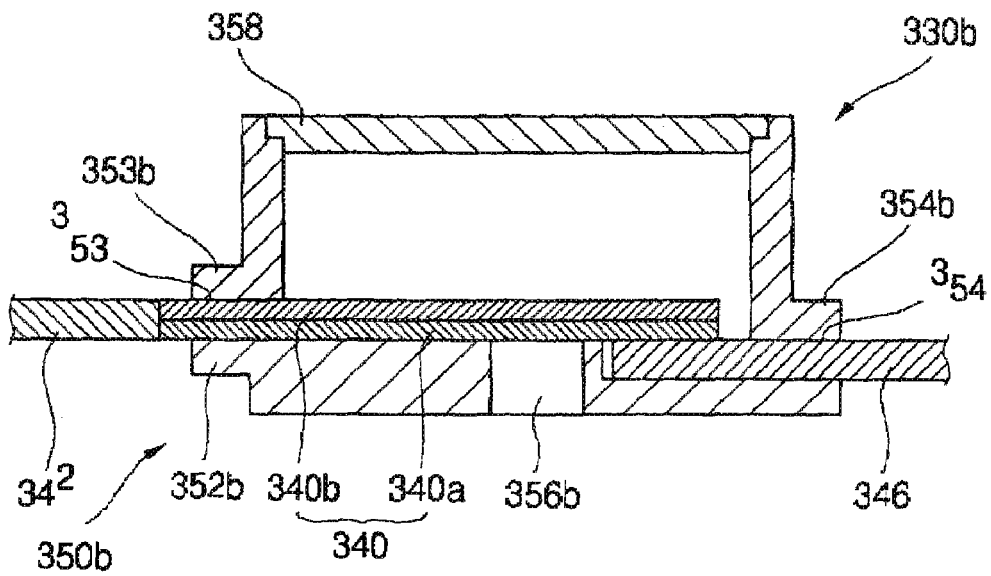
FIGS. 6a and 6a are sectional views showing a thermo-breaker according to yet other embodiments of the present invention.
Figure 6B:
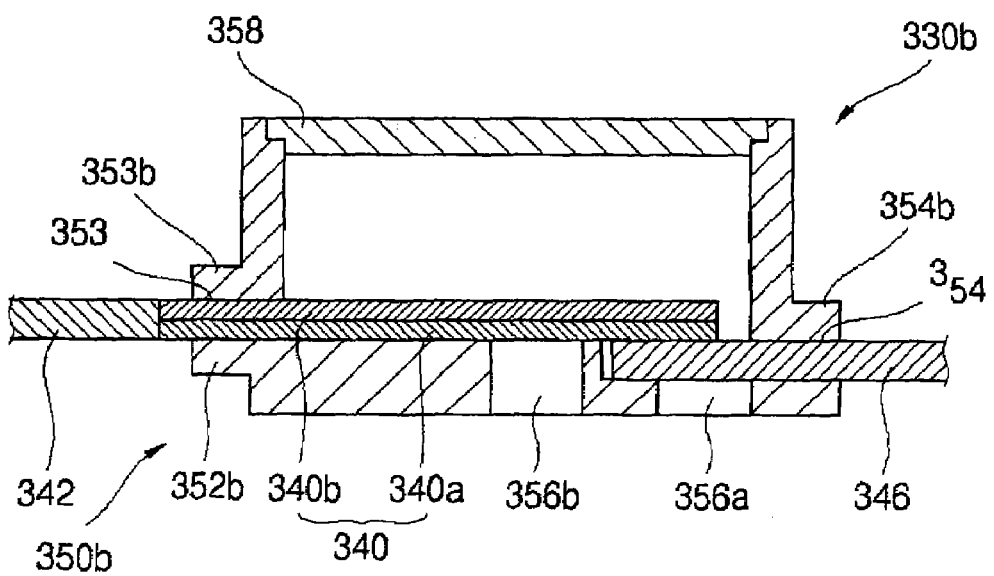

Referring to FIG. 6 showing another embodiment of the present invention, a case 350*b* constituting a thermo-breaker 330*b* includes a case body 352*b* and a cover 358. Repeated description of the components identical to those of the above-mentioned embodiment will be omitted, but the differences will now be described.

The case body 352*b* has a through-hole 356*b* formed at a location corresponding to the bottom on which the bimetal 340 is seated. The bimetal 340 is attached to the top of the through-hole 356*b* with an adhesive and seals it. As such, the bimetal 340 is exposed to the bottom of the case body 352*b*, specifically to the interior of a can 200, via the second through-hole 356*b*. Thus, the bimetal 340 can quickly sense the temperature change inside the can 200.

According to an alternative embodiment of the present invention as shown in FIG. 6*a*, the case body 352 may have both through-holes 356*a*, 356*b* formed on the bottom thereof.

Figure 7:
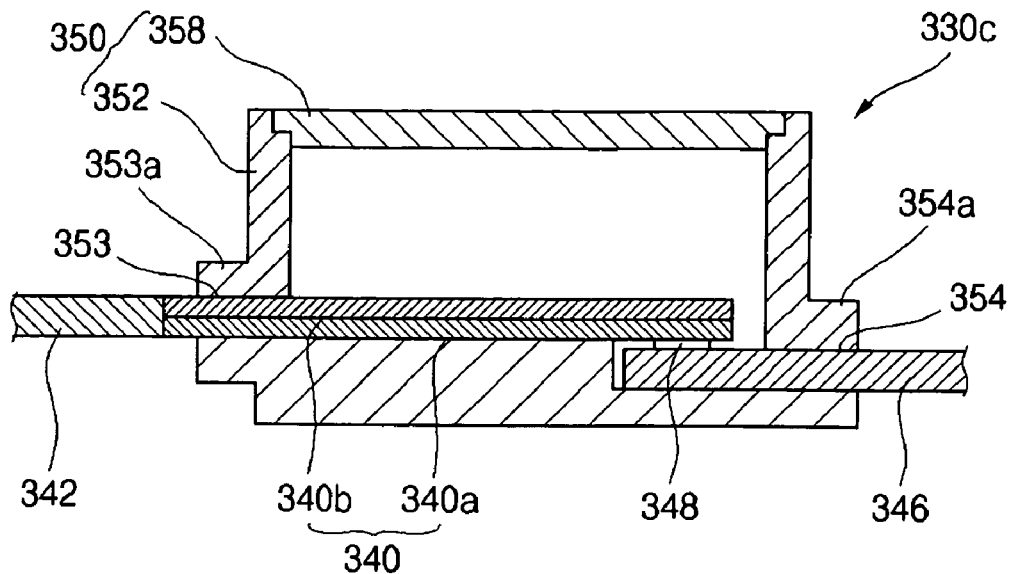
FIG. 7 is a sectional view showing a thermo-breaker according to still another embodiment of the present invention.

Referring to FIG. 7 showing another embodiment of the present invention, a thermo-breaker 330*c* may have an elastic body 348 positioned between a terminal lead wire 346 and a bimetal 340. More specifically, the elastic body 348 is positioned adjacent to an end of the terminal lead wire 346 which is in contact with the bimetal 340. This enhances the electrical connection between the bimetal 340 and the terminal lead wire 346. The elastic body 346 may be made of, for example, a leaf spring or a coil spring. The elastic body 346 may also be formed on the bimetal 340.

Figure 8:
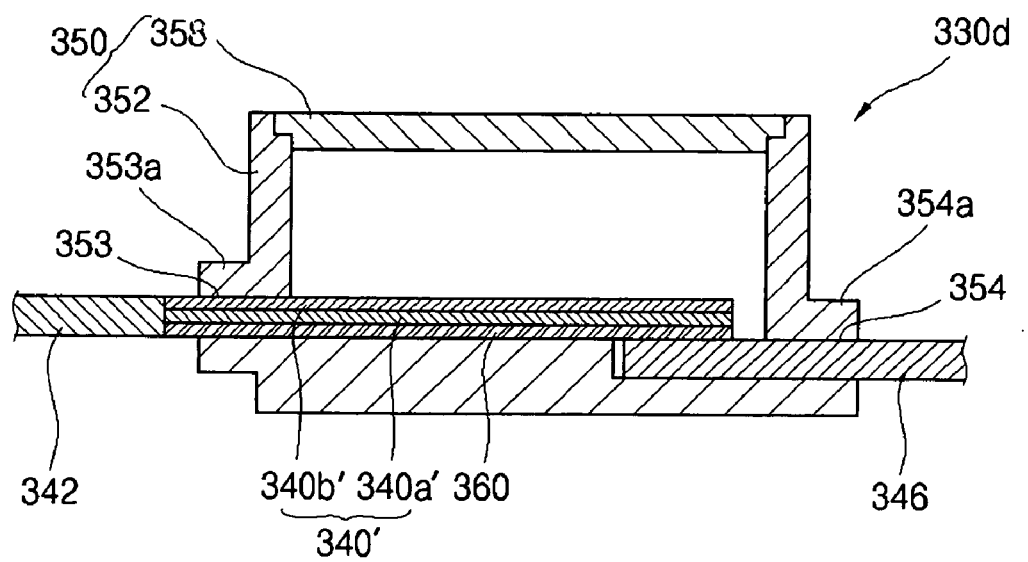
FIG. 8 is a sectional view showing a thermo-breaker according to another embodiment of the present invention.

Referring to FIG. 8 showing another embodiment of the present invention, a thermo-breaker 330*d* has an additional thin conductive plate 360 positioned beneath a bimetal 340'. The conductive plate 360 is made of metal having a low electrical resistance, such as copper, nickel, aluminum, or silver. The upper half of the bimetal 340' constitutes metal 340*b*' having a smaller expansion coefficient and is usually made of an alloy of nickel and iron, which has a low electrical conductivity. The lower half of the bimetal 340' constitutes metal 340*a*' having a larger expansion coefficient and may be made of an alloy of copper and zinc, an alloy of nickel, manganese, and iron, an alloy of nickel, chromium, and iron, or an alloy of nickel, manganese, and copper, which have relatively low electrical conductivity. The conductive plate 360, which is positioned beneath the bimetal 340' and which has excellent electrical conductivity, minimizes the loss of electrical current due to the electrical resistance of the bimetal 340'. In other words, the conductive plate 360 conducts electrical current between a tab lead wire 342 and a terminal lead wire 346 with minimized electrical resistance.

Figure 9:
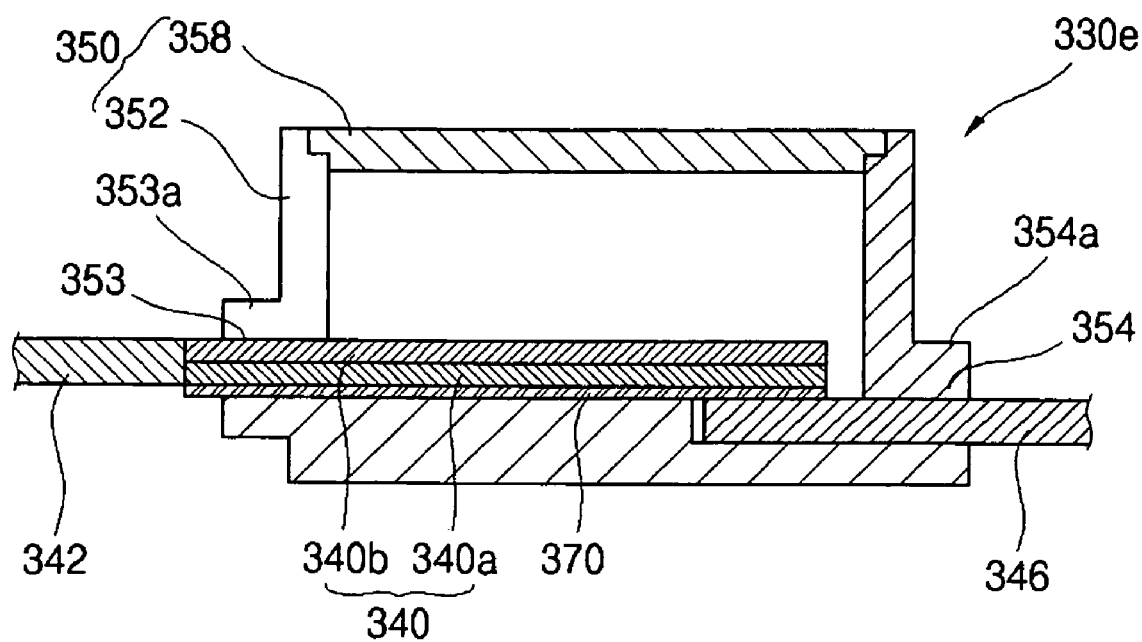
FIG. 9 is a sectional view showing a thermo-breaker according to yet another embodiment of the present invention.

Referring to FIG. 9 showing another embodiment of the present invention, a thermo-breaker 330e has an additional PTC ceramic thermistor 370 beneath a bimetal 340. The PTC ceramic thermistor 370 may be made of a ceramic device including barium titanate-based material. As the temperature changes, resistance of the PTC ceramic thermistor 370 increases and resistance heat is generated. If the temperature inside the can returns to normal, the bimetal 340 returns to its original position and makes contact with a terminal lead wire 346. Electrical current then flows through the secondary battery again. However, it may take some time for the temperature to return to a point at which the bimetal 340 functions. During that period of time, electrical current can flow through the secondary battery. This affects the electrode assembly and the protective circuit of the secondary battery and shortens the battery's service life. Because the PTC ceramic thermistor 370 generates resistance heat according to temperature change, the temperature of the bimetal 340 quickly rises so that the bimetal 340 can be actuated rapidly. As such, the period of time during which electrical current flows through the secondary battery is minimized, avoiding damage to the electrode assembly and the protective circuit of the secondary battery, and preventing the service life of the secondary battery from being significantly shortened. The PTC ceramic thermistor 370 may be positioned on top of the bimetal 340 or of the terminal lead wire 346.

The operation of the secondary battery according to an embodiment of the present invention will now be described in conjunction with the embodiments of the secondary protective device 330 shown in FIGS. 3 and 4. The operation will similarly apply to the other embodiments.

When the secondary battery according to the present invention undergoes overcharge or over-discharge due to an anomaly during charging or discharging, the temperature inside the battery may rise. If the temperature inside the battery reaches a predetermined value, the bimetal 340 of the thermo-breaker 330, which is a secondary protective device positioned between the first electrode tab 217 and the electrode terminal 320, deforms and loses physical and electrical contact with the terminal lead wire 346. Therefore, the electrical current between the first electrode tab 217 and the electrode terminal 320 is interrupted. This interruption of electrical current eliminates the overcharge or over-discharge of the secondary battery and prevents the explosion of the battery by eliminating an excessive pressure increase inside the battery caused by the anomaly. As such, any danger caused by the malfunction of the secondary battery is avoided and the safety of the secondary battery is increased.

As mentioned above, the secondary battery according to an embodiment of the present invention has a thermo-breaker, which acts as a secondary protective device positioned inside the battery and is more sensitive to temperature change inside the battery. When the temperature inside the battery reaches a predetermined value due to the overcharge or over-discharge of the battery, the bimetal loses contact and the electrical currents inside the battery are quickly interrupted. This avoids overcharge/over-discharge and/or explosion of the battery.

Because the bimetal is positioned in the protective device groove formed on the bottom surface of the cap plate, the increase in height of the cap assembly due to the bimetal is minimized while avoiding excessive occupation of the inner space of the can.

When the temperature inside the secondary battery returns to normal, the bimetal returns to its original position, allowing electrical current to flow and the secondary battery to be reused.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A secondary battery comprising:
   an electrode assembly having a first electrode tab and a second electrode tab;
   a can for containing the electrode assembly therein, the can having a top opening;
   a cap assembly including an electrode terminal and a cap plate having a surface insertable within the can for covering the top opening of the can, the surface having a protective device groove; and
   a thermo-breaker seated in the protective device groove, and being connected between the first electrode tab and the electrode terminal, the thermo-breaker comprising:
      a bimetal having an end connected to the first electrode tab;
      a terminal lead wire having a first end connected to the electrode terminal and having a second end in contact with the bimetal; and
      a case having a closed space into which the bimetal and the terminal lead wire are mounted, the case comprising a box-type case body with an open top, the box type case body having a bimetal hole adapted to receive the bimetal.

2. A secondary battery as claimed in claim 1, wherein the bimetal comprises a metal having a first expansion coefficient vertically laminated to a metal having a second expansion coefficient, and wherein the first expansion coefficient is larger than the second expansion coefficient.

3. A secondary battery as in claim 1, wherein the metal having the first expansion coefficient is made from one of the group consisting of an alloy of copper and zinc, an alloy of nickel and manganese or iron, an alloy of nickel, chromium, and iron, and an alloy of nickel, manganese, and copper.

4. A secondary battery as in claim 1, wherein the metal having the second expansion coefficient is made from an alloy of nickel and iron.

5. A secondary battery as claimed in claim 2, wherein the bimetal has a thickness of between about 0.1-1.0mm.

6. A secondary battery as claimed in claim 1, wherein the thermo-breaker further comprises an elastic body between the bimetal and the terminal lead wire.

7. A secondary battery as claimed in claim 6, wherein the elastic body is selected from the group consisting of a plate spring and a coil spring.

8. A secondary battery as claimed in claim 1, wherein the box-type case body further comprises a terminal lead wire hole adapted to receive the terminal lead wire and a cover for covering the open top.

9. A secondary battery as claimed in claim 1, wherein the box-type case body has a through-hole located such that the terminal lead wire is exposed through the box-type case body while sealing the through-hole.

10. A secondary battery as claimed in claim 1, wherein the box-type case body has a through-hole located such that the bimetal is exposed through the box-type case body while sealing the through-hole.

11. A secondary battery as claimed in claim 1, wherein the box-type case body has both a first through-hole and a second through-hole, wherein the terminal lead wire is exposed through the box-type case body while sealing the first through-hole, and wherein the bimetal is exposed through the box-type case body while sealing the second through-hole.

12. A secondary battery as claimed in claim 1, wherein the box-type case body is made from one of the group consisting of polypropylene, polyimide, polyphenylene sulfide and nylon 66.

13. A secondary battery as claimed in claim 1, wherein the thermo-breaker has a conductive plate positioned adjacent the bimetal.

14. A secondary battery as claimed in claim 13, wherein the conductive plate is made from one of the materials selected from the group of copper, nickel, aluminum and silver.

15. A secondary battery as claimed in claim 1, wherein the thermo-breaker has a thin plate-type ceramic positive temperature coefficient thermistor positioned adjacent to the bimetal.

16. A secondary battery as claimed in claim 15, wherein the ceramic positive temperature coefficient thermistor is made of barium titanate-based material.

17. A secondary battery as claimed in claim 1, wherein the first electrode tab and the second electrode tab are configured as a negative electrode tab and a positive electrode tab, respectively, and the electrode terminal is configured as a negative terminal.

18. A method of providing a secondary protection device of a secondary battery, the secondary battery including an electrode assembly having a first electrode tab and a second electrode tab, a can for containing the electrode assembly therein, the can having a top opening, a cap assembly including an electrode terminal and a cap plate having a surface insertable within the can for covering the top opening of the can, the method comprising:

locating a protective device groove on the surface of the cap plate;

mounting a thermo-breaker in the protective device groove, the thermo-breaker comprising a bimetal, a terminal lead wire having a first end and a second end, and a case having a closed space into which the bimetal and the terminal lead wire are mounted, the case comprising a box-type case body with an open top, the box-type case body having a bimetal hole adapted to recieve the bimetal; and connecting the thermo-breaker between the first electrode tab and the electrode terminal such that an end of the bimetal is connected to the first electrode tab, the first end of the terminal lead wire is connected to the electrode terminal, and the second end of the terminal lead wire contacts the bimetal.

* * * * *

UNITED STATES PATENT AND TRADEMARK OFFICE
CERTIFICATE OF CORRECTION

PATENT NO. : 7,462,416 B2  Page 1 of 1
APPLICATION NO. : 11/139050
DATED : December 9, 2008
INVENTOR(S) : Jun Ho Kim It is certified that error appears in the above-identified patent and that said Letters Patent is hereby corrected as shown below:

In the Claims

Column 10, line 17, Claim 18    Delete "recieve",
Insert --receive--

Signed and Sealed this

Twenty-second Day of September, 2009

David J. Kappos
*Director of the United States Patent and Trademark Office*